O. H. JEWELL.
APPARATUS FOR MAKING ARTIFICIAL ICE.
APPLICATION FILED JAN. 31, 1912.
1,180,537.
Patented Apr. 25, 1916.
3 SHEETS—SHEET 1.
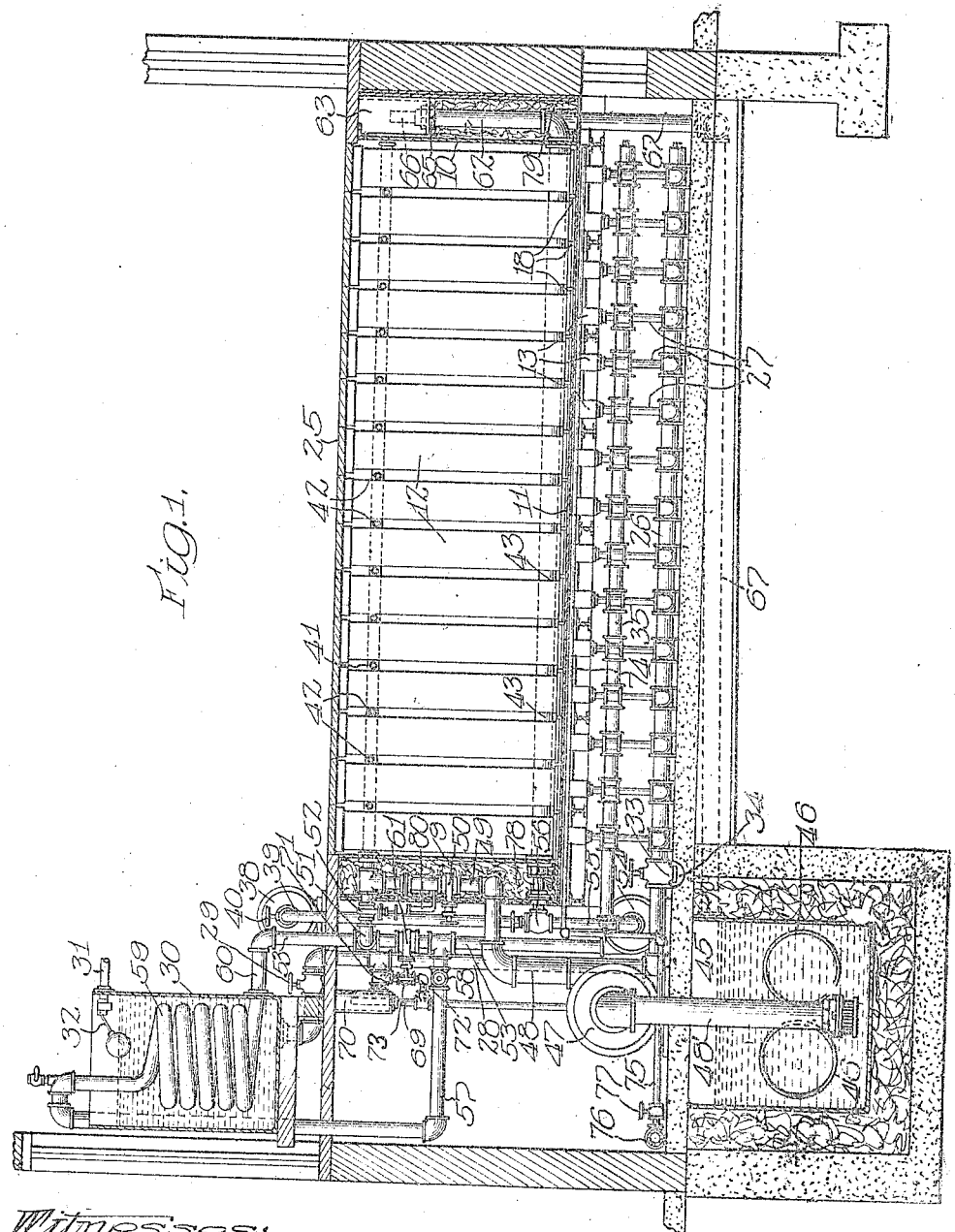
Witnesses:
H. W. Dumarys Jr.
R. Burkhardt
Inventor:
Omar H. Jewell
by Bond, Adams, Pickard & Jackson
his attys.

O. H. JEWELL.
APPARATUS FOR MAKING ARTIFICIAL ICE.
APPLICATION FILED JAN. 31, 1912.
1,180,537.
Patented Apr. 25, 1916.
3 SHEETS—SHEET 2.
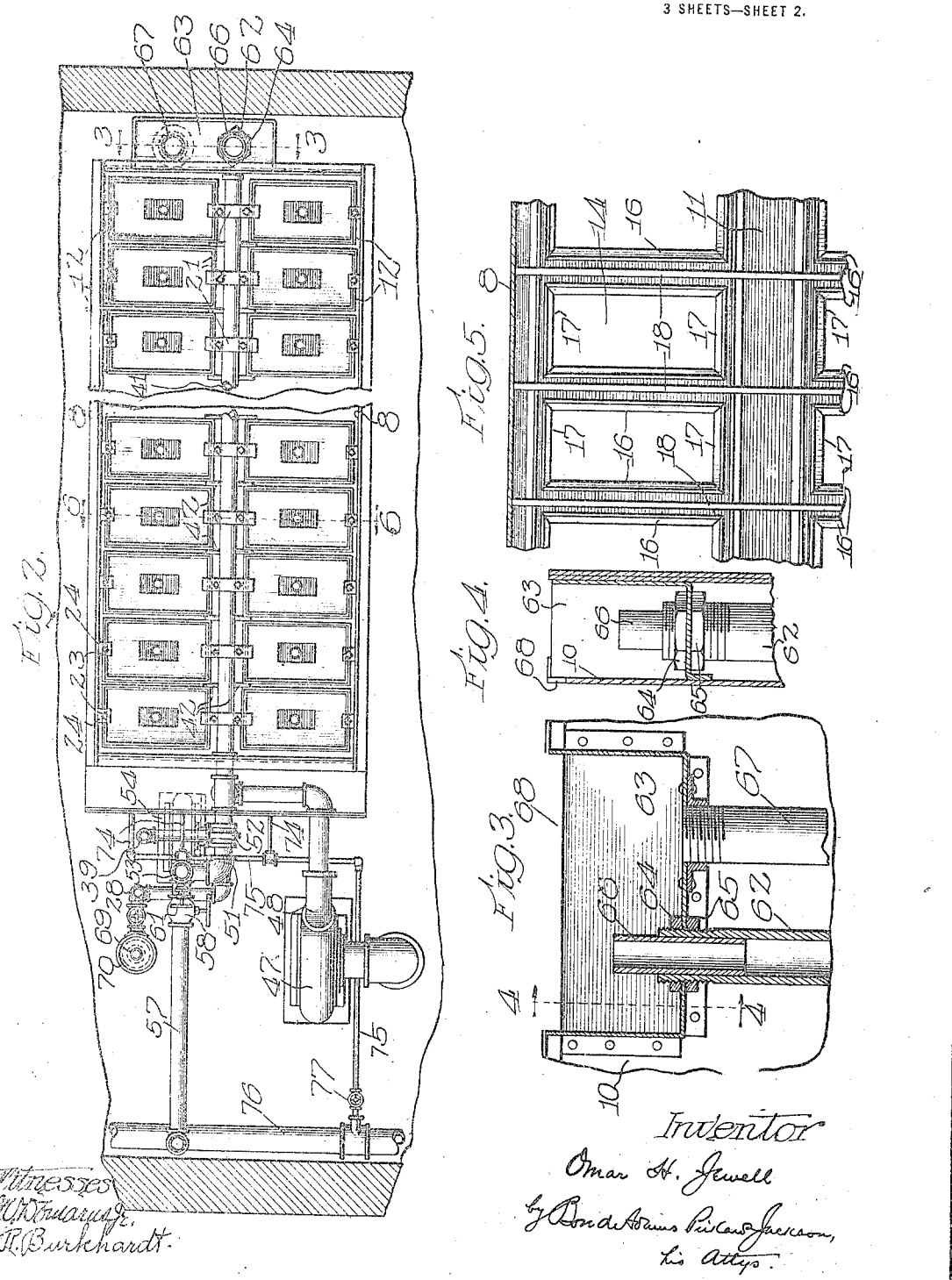

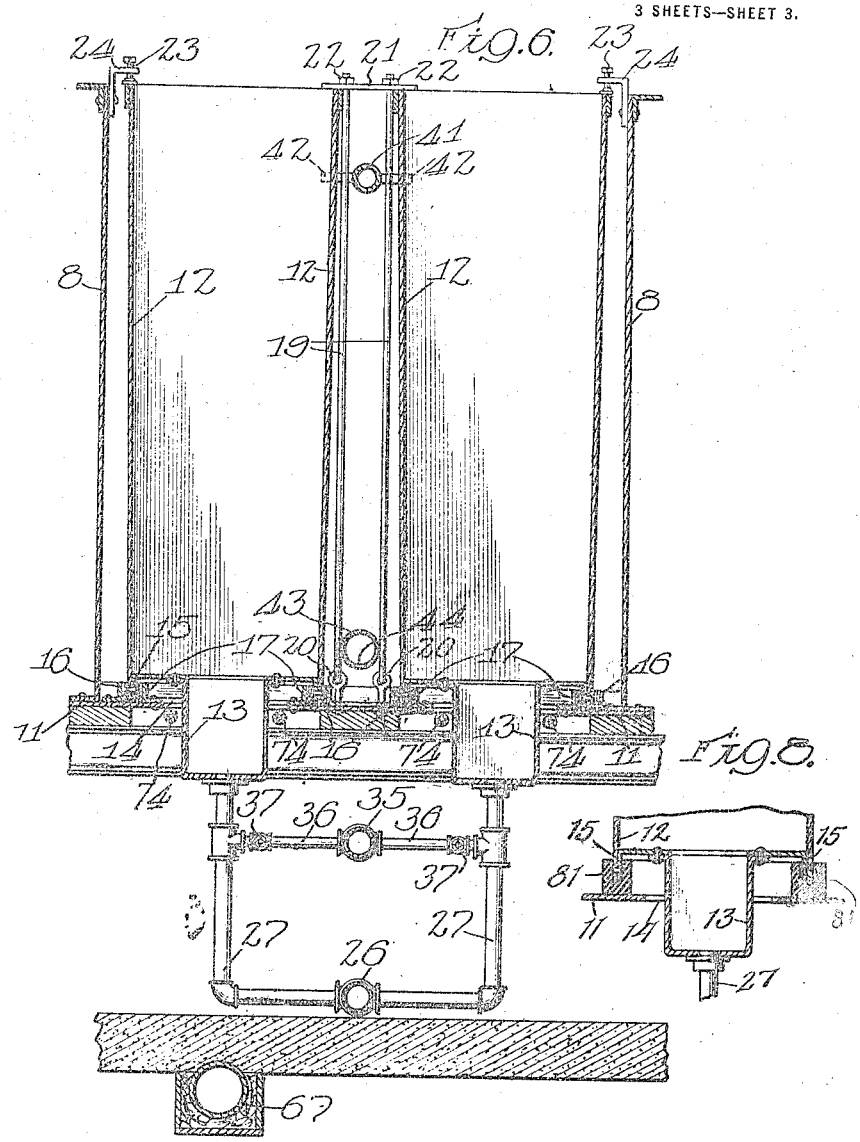

UNITED STATES PATENT OFFICE.

OMAR H. JEWELL, OF CHICAGO, ILLINOIS, ASSIGNOR, BY DIRECT AND MESNE ASSIGNMENTS, OF ONE-HALF TO POLAR ICE MACHINE COMPANY, OF CHICAGO, ILLINOIS, A CORPORATION OF ILLINOIS, AND ONE-HALF TO HENRY D. POWNALL, OF CANTON, OHIO.

APPARATUS FOR MAKING ARTIFICIAL ICE.

1,180,537.     Specification of Letters Patent.     Patented Apr. 25, 1916.

Application filed January 31, 1912. Serial No. 674,464.

*To all whom it may concern:*

Be it known that I, OMAR H. JEWELL, a citizen of the United States, residing at Chicago, in the county of Cook and State of Illinois, have invented certain new and useful Improvements in Apparatus for Making Artificial Ice, of which the following is a specification, reference being had to the accompanying drawings.

My invention relates to the manufacture of artificial ice and has to do not only with the freezing of the water but also with the tempering and harvesting of the ice.

My improved apparatus, which forms the subject-matter of this application for patent, is designed for use in the manufacture of ice from raw water according to the method set forth in Letters Patent of the United States, No. 934,972, granted to me September 21, 1909, according to which the freezing medium is applied to the upper portion of a suitable receptacle, such as a can, containing the water to be frozen, leaving the lower portion thereof exposed to a non-freezing temperature and maintaining an unfrozen zone of water at the bottom of the receptacle, the water being agitated during the freezing operation by the introduction through the non-freezing zone of compressed air.

The objects of my invention are to provide efficient apparatus for making ice on a large scale according to the process of my said Patent No. 934,972, by which the proper circulation of the brine is secured, and the proper depth of the brine around the several cans or containers in which the water is frozen may be constantly maintained and danger of overflow avoided; by which also the several containers may be filled to the proper level and such level be automatically maintained as freezing progresses, without wastage of water; to provide also for economically precooling the water to be frozen; to provide also for the discharge of the impure water after the freezing operation is completed without contaminating the fresh charge of water supplied to the cans; to provide for releasing the ice after tempering, for harvesting the same; and to provide improved means for securing the ice containers in place. I accomplish these objects as illustrated in the drawings and as hereinafter described.

What I regard as new is set forth in the claims.

In the accompanying drawings,—Figure 1 is a longitudinal vertical section showing one unit of the ice-making apparatus, together with a brine tank and pump which may supply a plurality of units with brine; Fig. 2 is a plan view, partly broken away, of the parts shown in Fig. 1; Fig. 3 is an enlarged detail, being a vertical cross-section on line 3—3 of Fig. 2; Fig. 4 is a vertical section on line 4—4 of Fig. 3; Fig. 5 is a plan view of the lower portion of the tank in which are placed the cans or containers which make up one of the units of the apparatus; Fig. 6 is an enlarged vertical cross-section on line 6—6 of Fig. 2; Fig. 7 is an enlarged detail, being a partial vertical sectional view illustrating the manner in which the bottoms of the cans are fitted in the tank in which they are placed; and Fig. 8 is a detail showing a modification.

Referring to the drawings,—8 indicates a tank of any suitable material and of such size as to contain the desired number of cans in which the ice is formed. Preferably the tank 8 is made rectangular in form and wide enough to take in two rows of cans when they are placed end to end, as shown in Fig. 2.

9—10 indicate the ends of the tank 8, and 11 the bottom thereof, as shown in Fig. 1.

12 indicates a series of cans placed in the tank 8, as above suggested. As best shown in Figs. 6 and 7, the cans 12 are provided with extensions 13 at the bottom, such extensions forming non-freezing zones in which no ice, or practically no ice, is formed. As shown in Figs. 5 and 6, the bottom 11 of the tank 8 is provided with openings 14 through which the bottoms of the cans are exposed to the atmosphere, and through which said extensions 13 project so that the greater part of each of such extensions lies below the bottom 11 of the tank and is laterally exposed to the atmosphere as shown in Figs. 6 and 7. At their lower margins the cans 12 are provided with flanges 15 which rest on the bottom 11 in grooves formed by oppositely-disposed angle-irons 16—17, best shown in Fig. 6. The grooves formed by the angle-irons 16—17 are somewhat wider than the flanges 15 and the space between them is filled in with cement, or other suitable material, so as to make water-tight connections and prevent the escape of brine under the cans and out through the openings 14. By this construction not only the cans are held firmly in position, but they may readily be removed when necessary. At the lower side edges of the cans where they lie close together, as shown in Fig. 7, the flanges 15 of the two adjoining cans are fitted in the same groove, but instead of filling the entire space between them with cement I prefer to employ strips 18 of wood or other suitable material, as shown in Fig. 7. The cans are further secured in place by means of rods 19 secured to the bottom 11, preferably by eye-bolts 20, as shown in Fig. 6, and connected at their upper ends to cross-bars 21 which rest on the upper inner margins of the cans. Nuts 22 on the upper ends of the rods 19 provide for clamping the bars 21 down on the upper edges of the cans and for releasing them when desired. The outer edges of the cans are secured by set-screws 23 passing through brackets 24 secured to the sides of the tank and bearing down on the outer margins of the upper edges of the cans.

25 indicates boards or planks which rest on top of the cans to form a floor thereover. Said planks are, of course, removed when the ice is being harvested.

26 indicates a header or pipe through which water to be frozen is supplied to the several cans and through which the impurities separated by the freezing operation are withdrawn from the several cans. As shown in Figs. 1 and 6, the header 26 extends longitudinally of the tank 8 at about the center thereof and is placed at some distance below the bottom 11 of said tank. It is connected by pipes 27 with the lower portions of the several extensions 13 of the cans, as clearly shown in Fig. 6, so that it communicates with all the cans in the tank. The header 26 is connected by a pipe 28 and a valve 29 with the lower portion of a precooling tank 30, as shown in Fig. 1, so that when the valve 29 is open water may be supplied to the several cans from the precooling tank 30. The tank 30 receives its supply through a pipe 31 controlled by a float-valve 32 so that it is always kept full of water.

33 indicates a valve placed near the inner end of the header 26 for discharging the impurities coming from the several cans into the sewer, represented by the drain 34 in Fig. 1, the arrangement being such that when the valve 33 is open the impure water in the several cans flows down through the several pipes 27 and header 26 to the drain 34.

35 indicates an air-pipe or header, which also extends longitudinally of the tank 8 and is preferably placed immediately above the water header 26. The air header 35 is connected by pipes 36 with the several pipes 27 and supplies compressed air to the several cans through the extensions 13 thereof. Valves 37 are provided for independently regulating the supply of air to the several cans. The air header 35 receives compressed air from an air-pump 38, shown in Fig. 1, through a pipe 39 provided with a valve 40. By adjusting the valve 40 the air pressure in the header 35 may be regulated, while by operating the valves 37 the air supply of the several cans may be independently controlled.

41 indicates a brine inlet pipe which extends longitudinally of the tank 8 between the two rows of cans, as shown in Fig. 6, and is provided with laterally-projecting nozzles 42 extending in opposite directions between the several cans, as shown in Fig. 2, and in dotted lines in Fig. 6, for discharging brine throughout the tank. It will be noted that, as clearly shown in Fig. 6, the brine inlet pipe 41 is near the upper margins of the several cans so that the incoming brine enters at the upper portion of the tank.

43 indicates a brine outlet pipe which extends longitudinally of the tank 8 between the rows of cans and is near the bottom of the tank. Said pipe is provided with a series of openings 44 in its under side so that the outgoing brine is taken from very near the bottom of the tank.

Cold brine is supplied to the brine inlet pipe 41 from a brine tank 45, shown in Fig. 1, which is placed at a sufficiently low level to permit the warm brine coming from the refrigerating tank 8 to return by gravity, as hereinafter described, and it is suitably insulated so that the brine may readily be cooled and maintained at the proper temperature. In the drawings I have shown the brine tank as provided with cylindrical coolers 46 which contain the ammonia or other substance by which the cooling of the brine is accomplished.

47 indicates a pump which connects with the brine tank 45 by a suction-pipe 48' and serves to pump the brine from said brine tank and deliver it to the several units of the plant through a discharge pipe 48, the brine inlet pipe 41 of each of the units being connected with said discharge pipe 48. In the drawings the pipe 41 is connected with the pipe 48 by a pipe 49 having a valve 50, as shown in Fig. 1. The brine inlet pipe 41 is also connected by a pipe 51 having a valve 52 with a pipe 53, the lower end of which is connected with the outlet end of a pump 54, as shown in Fig. 1. The inlet end of the pump 54 is connected by a pipe 55 having a valve 56 with the outlet pipe 43 in the bottom of the tank 8, as shown in Fig. 1. The arrangement is such that by closing the valve 50 and thereby cutting off the brine inlet pipe from the main brine tank pump 47, opening the valve 56 and operating the pump 54, the brine in the refrigerating tank may be caused to circulate as long as may be desired without either introducing fresh brine or returning brine from the refrigerating tank to the brine tank. The purpose of this arrangement is to provide for tempering the ice when the operation of freezing is practically completed, since by causing the same brine to circulate through the refrigerating tank for some time it gradually will become warmer and the raising of the temperature of the ice will temper it and prevent it from cracking when withdrawn from the cans or during the later stages of the tempering process. In order to complete the tempering process and release the ice from the sides of the cans, I provide for warming the brine which is circulated through the refrigerating tank. To this end the pipe 53 leading from the pump 54 is connected by a pipe 57 having a valve 58 with a coil 59 placed in the precooling tank 30, the lower end of said coil being connected by a pipe 60 with the upper end of the pipe 53, as shown in Fig. 1. A valve 61 is provided in the pipe 53 between the pipes 51 and 57, as shown in Fig. 1. By this construction, by closing the valve 61 and opening the valve 58, the operation of the pump 54 causes the brine withdrawn from the refrigerating tank 8 to flow through pipe 57 and coil 59 and thence back to the inlet pipe 41, through pipe 60, so that the brine coming from the refrigerating tank is warmed by the action of the water in the precooling tank, at the same time cooling the water in said tank preparatory to its being admitted to the several cans. I thus economize by utilizing the low temperature of the brine coming from the refrigerating tank to precool the water to be used for supplying the next charge of the several cans, and also take advantage of the naturally higher temperature of the water supply to warm the brine circulating through the refrigerating tank sufficiently to complete the tempering operation and prepare the ice for harvesting.

In the freezing operation the cold brine from the brine tank 45 is introduced into the refrigerating tank 8 through the nozzles 42 of the pipe 41, as above described, and after accomplishing its work in the refrigerating tank it passes out through pipe 43. During this operation the valve 56 is closed so that the brine does not pass out of the pipe 43 in that direction. From an inspection of Fig. 1 it will be noted that the opposite end of the outlet pipe 43 extends out through the end wall 10 of the refrigerating tank and there is turned up, as shown at 62 in Fig. 1, and terminates in a receptacle 63 which is on a level with the upper portion of the tank, as shown in Figs. 1 and 3. The up-turned portion 62 of the outlet pipe 43 passes up through the bottom of the receptacle 63 and is secured thereto, preferably by nuts 64—65 screwed thereon, as shown in Fig. 3. Within the receptacle 63 the pipe 62 is provided with an adjustable tube 66, preferably telescoped in the pipe 62, so that the level of its upper end may be adjusted. Obviously, the brine will stand at the same level in the tube 66 as in the refrigerating tank 8, and therefore by setting the tube 66 low enough the brine will flow from the refrigerating tank 8 into the receptacle 63 by overflow through the tube 66. By adjusting the tube 66 the level of the brine in the refrigerating tank 8 may accordingly be regulated. The brine passing into the receptacle 63, is discharged through a return pipe 67 which opens into the bottom of the receptacle 63 and discharges into the upper portion of the brine tank 45, as shown in Fig. 1. Thus the brine, after circulating through the refrigerating tank 8, passes out through the receptacle 63 and back to the brine tank through pipe 67, and the level of the brine in the refrigerating tank may be maintained at any desired point by properly setting the tube 66. The several pumps are designed to be operated electrically, by motors, and to avoid the danger of spoiling the freeze by the sudden speeding up of the pump 47 so that it pumps brine into the refrigerating tank faster than the outlet pipe 43 can conduct it away, I provide for the overflowing of the brine in the refrigerating tank into the receptacle 63 in such an emergency, by providing a cut-away portion 68 in the end wall 10 opposite the receptacle 63, as shown in Figs. 3 and 4. This emergency outlet together with the regulating outlet tube 66 are sufficient to insure that the brine shall not rise in the refrigerating tank high enough to overflow the tank. The return pipe 67 is, of course, large enough to take care of any abnormal flow.

As is well understood, in the freezing operation water expands about one-tenth of its volume, and in order to allow for such expansion without discharge of water from the cans, they are filled so that the level of the water stands enough below the level of the ice to be formed to compensate for this difference in volume. The filling of the cans to the proper level before freezing, and the prevention of overflow out of the cans due to expansion during freezing, are provided for by two overflow discharge pipes at different levels.

69 indicates an overflow pipe the upper end of which opens into a small chamber or receptacle 70 and the lower portion of which is connected with pipe 28 by a pipe 71.

72 indicates an overflow discharge pipe which conducts the pipe 71 with the pipe 69 at a point below the chamber 70. Said pipe 72 is provided with a valve 73, as shown in Fig. 1. The pipe 71 is placed at the level to which the several cans are filled with water before freezing is begun, and consequently, if the valve 73 is open, as soon as the water reaches that level it will begin to overflow through pipes 71 and 72 to pipe 69, through which it is discharged into the sewer or drain. The flow of water to the cans is then cut off and the valve 73 shut, and consequently no further water escapes from the cans until the point of greatest expansion is reached, at which time the freezing operation is practically completed. The upper end of the pipe 69 stands at about the normal level of the surface of the ice in the several cans, and consequently as the pipe 28 is connected with the header 26 which connects with the interior of the several cans, water will stand in the chamber 70 at the same level as in the several cans and will not overflow into the pipe 69 unless the expansion due to freezing causes the water to rise unusually high. When the freezing operation is completed in all the cans, the valve 33 is opened, allowing the impure water from the several cans to escape to the sewer, as hereinbefore suggested. The valve 33 is then closed and water admitted to the several cans from the precooling tank 30 by opening valve 29. Of course, until the ice in the several cans is loosened from the walls and bottoms of the cans, the water does not flow into the cans to any considerable extent, but as soon as the ice is formed it is floated up and when removed the cans immediately fill with the precooled water and are ready for the next freeze. By this construction there is practically no waste of water, as the only water thrown away is the water containing the impurities separated by the freezing operation, which is negligible in quantity.

In the freezing process, although the bottoms of the cans are exposed to the atmosphere, as shown in Figs. 6 and 7, some ice is formed upon the bottoms of the cans, and it is, therefore, necessary to dislodge the ice at such points to facilitate harvesting. To accomplish this end, I provide for spraying water at ordinary temperature against the bottoms of the cans by means of pipes 74 which extend longitudinally of the refrigerating tank under the bottoms of the cans, as shown in Fig. 6, and are provided with orifices which direct jets of water up against the bottoms of the cans when the ice is ready to be harvested. The pipes 74 are connected to a supply pipe 75, shown in Figs. 1 and 2, leading from a main 76, said pipes 75 being provided with valves 77 which control the admission of water to the several pipes 74. By opening the valves 77 the sprays are directed against the bottoms of all the cans, thereby freeing the ice and permitting the mass of ice in the cans to float to the top.

As shown in Fig. 1, the pipes 49, 62 and 67 are preferably placed in insulated chambers 78—79, respectively, to keep them at a low temperature.

80 indicates a thermometer connected with the pipe 49 for the purpose of indicating the temperature of the inflowing brine.

In using the apparatus described the several cans are first filled with water, to the level of the pipe 71, by opening the valve 29. At this time the main discharge valve 33 in pipe 26 is shut and valve 73 in pipe 72 is open. As soon the water reaches the proper level it overflows through pipe 72, and valves 29 and 73 are then closed. The valves 52 and 56 being closed, the main brine pump 47 is started, causing cold brine to flow into the refrigerating tank through pipes 49 and 41, the brine being discharged into the upper portion of the refrigerating tank through the nozzles 42 so that it circulates around the several cans and passes out through outlet pipe 43, thence through pipe 62 and tube 66 to the receptacle 63, where it is discharged through pipe 67, returning through the latter pipe to the brine tank. Should the pump 47 be running too fast, so that the tube 66 cannot take care of the quantity of brine supplied, the brine overflows into the reservoir 63 through the emergency outlet 68. By locating the outlet header 43 below the verticle center of the several cans, it takes up and circulates the cold brine, which would otherwise settle to the bottom of the refrigerating tank and prevent the tempering or harvesting of the ice, and by introducing the brine through a plurality of nozzles, as described, more perfect circulation of the brine in all parts of the refrigerating tank is established and maintained. The use of the adjustable tube 66 provides for maintaining the necessary difference of head between the influent and effluent brine so as to insure a proper circulation of the brine throughout the refrigerating tank. When the freezing operation is practically completed, the valve 50 is closed, cutting off the header 41 from the brine-pump 47, and valves 56 and 52 are opened. The pump 54 is then started, causing the brine contained in the refrigerating tank to circulate without passing to the brine-tank 45. At first this circulation of a constant body of brine continues the freezing, but the brine gradually becomes warmer, tempering the ice slowly and preparing it for the subsequent stage of the tempering process. This is particularly necessary where the ice is frozen at a low temperature, since, in the latter case, if the ice were immediately subjected to a comparatively warm temperature it would crack and its value commercially be very materially reduced. After this preliminary tempering, which may be maintained until the brine is raised to a temperature of about twelve degrees Fah., valve 58 is opened and valve 61 is closed. This brings into the brine circuit the coil 59, the brine then flowing through pipe 57 to said coil and back to the inlet header 41 through pipes 60 and 53. The brine passing through the coil 59 is warmed by the water in the tank 30, cooling such water. The brine is thus raised to a temperature of about forty degrees Fah., and by its circulation through the refrigerating tank detaches the ice from the sides of the cans. At the same time, water is sprayed against the bottoms of the cans through the pipes 74 by the opening of the valve 77, which dislodges the ice from the bottoms of the cans. As soon as the freezing is completed, the valve 33 is opened, allowing the impure water in the bottoms of the cans and in the extensions 13 thereof to pass out to the sewer. The valve 33 is then closed and the valve 29 again opened slightly, admitting water from the tank 30 to the several cans to supply enough water to the cans to float the ice therein. As soon as the ice floats, it is withdrawn and the cans are again filled with water for the next freeze by opening the valve 29 wider until the cans are filled to the proper level.

In Fig. 8 I have shown a modified construction for sealing the bottoms of the containers 12 to prevent leakage of brine under them, which may be used in lieu of the constructions shown in Figs. 6 and 7. In the construction shown in Fig. 8 I employ the same container, but the bottom 11 of the refrigerating tank is not provided with the grooves formed by the flanges 16—17, and in lieu of such grooves and the cement packing hereinbefore described, I employ a rubber gasket 81, which is simply a rectangular grooved gasket of suitable shape to receive the flange 15, said gasket fitting between the flange and the bottom 11 of the refrigerating tank. When the container 12 is clamped down upon the bottom of the refrigerating tank by means of the rods 19 and nuts 22, together with the set-screws 23, as hereinbefore described, the gasket 81 is compressed between the flange 15 and the bottom of the tank, thereby making a tight closure. The container may, however, be readily removed by simply releasing the clamping devices.

That which I claim as my invention, and desire to secure by Letters Patent, is,—

1. An apparatus for making artificial ice, comprising a refrigerating tank, one or more containers therein for the water to be frozen, means for circulating a refrigerant through said tank, and means for warming the bottoms of said containers when the ice is to be harvested.

2. An apparatus for making artificial ice, comprising a refrigerating tank having one or more openings in the bottom thereof, one or more containers in said tank having their bottoms fitted over the openings therein, means for circulating a refrigerating liquid through said tank, and means for warming the bottoms of said containers when the ice is to be harvested.

3. An apparatus for making artificial ice, comprising a refrigerating tank having one or more openings in the bottom thereof, one or more containers in said tank having their bottoms fitted over the openings therein, said containers having extensions projecting through said openings, means for circulating a refrigerating liquid through said tank, and means for warming the bottoms of said containers when the ice is to be harvested.

4. An apparatus for making artificial ice, comprising a refrigerating tank having one or more openings in the bottom thereof, one or more containers in said tank having their bottoms fitted over the openings therein, means for circulating a refrigerating liquid through said tank, and means for spraying the bottoms of said containers for warming the same.

5. An apparatus for making artificial ice, comprising a refrigerating tank having one or more openings in the bottom thereof, one or more containers in said tank having their bottoms fitted over the openings therein, said containers having extensions projecting through said openings, means for circulating a refrigerating liquid through said tank, and means for spraying the bottoms of said containers for warming the same.

6. An apparatus for making artificial ice, comprising a refrigerating tank, one or more containers therein for the water to be frozen, pipes connected with said containers for supplying water thereto, an overflow discharge for controlling the filling level of the water in said containers, a second overflow discharge at a higher level for controlling the maximum level of the water in said containers, and a valve for closing said first-mentioned discharge.

7. An apparatus for making artificial ice, comprising a refrigerating tank, one or more containers therein for the water to be frozen, pipes connected with said containers for supplying water thereto, a reservoir for supplying water to said pipes, an overflow discharge for controlling the filling level of the water in said containers, a second overflow discharge at a higher level for controlling the maximum level of the water in said containers, and a valve for closing said first-mentioned discharge.

8. An apparatus for making artificial ice, comprising a refrigerating tank, one or more containers therein for the water to be frozen, a reservoir, a pipe connected with said reservoir and with the lower portions of the several containers, an overflow discharge connected with said pipe and adapted to overflow at the filling level of the water in the containers, a valve for cutting off said discharge from said pipe, and a second overflow discharge at a higher level also connected with said pipe for controlling the maximum level of the water in said containers.

9. An apparatus for making artificial ice, comprising a refrigerating tank, containers therein for the water to be frozen, means for introducing brine into said tank, and an outlet pipe for the discharge of brine from said tank, said outlet pipe in said tank having an externally-disposed adjustable overflow discharge for controlling the normal level of the brine in said tank.

10. An apparatus for making artificial ice, comprising a refrigerating tank, containers therein for the water to be frozen, means for introducing brine into said tank, and an outlet pipe in the lower portion of said tank, said outlet pipe having an adjustable overflow discharge for controlling the normal level of the brine in said tank.

11. An apparatus for making artificial ice, comprising a refrigerating tank, containers therein for the water to be frozen, means for introducing brine into said tank, an outlet pipe for the discharge of brine from said tank, said outlet pipe having an overflow discharge at the normal level of the brine in said tank, and an overflow outlet from said tank at a higher level than the normal level of the brine therein.

12. An apparatus for making artificial ice, comprising a refrigerating tank, containers therein for the water to be frozen, means for introducing brine into said tank, an outlet pipe in the lower portion of said tank, a receptacle adjacent to the upper portion of the tank, said outlet pipe being arranged to overflow into said receptacle, and a discharge pipe opening from the lower portion of said receptacle.

13. An apparatus for making artificial ice, comprising a refrigerating tank, containers therein for the water to be frozen, means for introducing brine into said tank, an outlet pipe in the lower portion of said tank, a receptacle adjacent to the upper portion of the tank, said outlet pipe being arranged to overflow into said receptacle, a discharge pipe opening from the lower portion of said receptacle, and a direct overflow passage between said refrigerating tank and said receptacle at a higher level than the normal level of the brine in said tank.

14. An apparatus for making artificial ice, comprising a refrigerating tank, containers in said tank for the water to be frozen, an inlet pipe in the upper portion of said tank arranged to discharge brine laterally into said tank, an outlet pipe in the lower portion of said tank, said outlet pipe having openings at different points in the tank, means for controlling the level of the brine in said tank, a brine tank, means for conducting the effluent from said outlet pipe to the brine tank, and means for supplying brine from said brine tank to the inlet pipe.

15. An apparatus for making artificial ice, comprising a refrigerating tank, containers in said tank for the water to be frozen, an inlet pipe in the upper portion of said tank having a plurality of laterally-projecting nozzles, an outlet pipe in the lower portion of said tank, said outlet pipe having openings at different points in the tank, a brine tank, means for conducting the effluent from said outlet pipe to the brine tank, and means for supplying brine from said brine tank to the inlet pipe.

16. An apparatus for making artificial ice, comprising a refrigerating tank having an opening in the bottom thereof, a container for the water to be frozen, said container having a marginal flange at the bottom thereof adapted to extend around said opening, a groove at the bottom of said tank to receive said flange, said flange being secured in said groove by a water-tight connection, and means for causing the refrigerant to circulate through said tank.

17. An apparatus for making artificial ice, comprising a refrigerating tank having an opening in the bottom thereof, a container for the water to be frozen, said container having a marginal flange at the bottom thereof adapted to extend around said opening, a groove at the bottom of said tank to receive said flange, said flange being cemented in said groove, and means for causing the refrigerant to circulate through said tank.

18. An apparatus for making artificial ice, comprising a refrigerating tank having an opening in the bottom thereof, a container for the water to be frozen fitting over said opening and having its bottom exposed therethrough to the atmosphere, said container being adapted to fit over said opening, and devices connected with the refrigerating tank and engaging the upper margin of the container for clamping the container in position.

19. An apparatus for making artificial ice, comprising a refrigerating tank having an opening in the bottom thereof, a container for the water to be frozen, said container being adapted to fit over said opening, a rod connected with the bottom of the tank, a plate fitted on said rod and overlying the margin of the container, and means for clamping said plate down upon the container.

20. An apparatus for making artificial ice, comprising a refrigerating tank having an opening in the bottom thereof, a container for the water to be frozen, said container being adapted to fit over said opening, a bracket secured to one side of the tank adjacent to the upper margin of the container, and a set-screw fitted in said bracket bearing upon the upper margin of the container for clamping the same in position.

21. An apparatus for making artificial ice, comprising a refrigerating tank having openings in the bottom thereof, containers side by side in said tank over said openings, a plate overlying the adjacent margins of said containers, and means connected with the bottom of the tank and engaging said plate for clamping the plate down upon the upper margins of the containers.

22. An apparatus for making artificial ice, comprising a refrigerating tank having openings in the bottom thereof, containers side by side in said tank over said openings, a plate overlying the adjacent margins of said containers, rods connected with the bottom of the tank and passing through said plate, and nuts screwed upon the upper ends of said rods for clamping said plate upon the upper margins of the containers.

23. An apparatus for making artificial ice, comprising a refrigerating tank having openings in the bottom thereof, containers side by side in said tank over said openings, a plate overlying the adjacent margins of said containers, means connected with the bottom of the tank and engaging said plate for clamping the plate down upon the upper margins of the containers, brackets secured to the side of the tank adjacent to the upper margins of said containers, and set screws in said brackets engaging the upper margins of the containers.

24. An apparatus for making artificial ice, comprising a refrigerating tank having openings in the bottom thereof, containers side by side in said tank over said openings, a plate overlying the adjacent margins of said containers, rods connected with the bottom of the tank and passing through said plate, nuts screwed upon the upper ends of said rods for clamping said plate upon the upper margins of the containers, brackets secured to the sides of the tank adjacent to the upper margins of the said containers, and set screws in said brackets engaging the upper margins of the containers.

OMAR H. JEWELL.

Witnesses:
W. H. DE BUSK,
MINNIE A. HUNTER.